United States Patent [19]

Ishijima

[11] Patent Number: 5,842,135
[45] Date of Patent: Nov. 24, 1998

[54] SHORT WAVE TRANSMISSION METHOD AND APPARATUS THEREFOR

[75] Inventor: Iwao Ishijima, 4-20-1, Nakahara, Mitaka-shi, Tokyo, Japan

[73] Assignees: Iwao Ishijima; Masao Tsujita, both of Tokyo, Japan

[21] Appl. No.: 647,798

[22] Filed: May 15, 1996

[30] Foreign Application Priority Data

Jun. 9, 1995 [JP] Japan ................................. 7-168375

[51] Int. Cl.$^6$ ............................ H04B 7/005; H04B 7/01; H04B 7/015; H04B 15/00
[52] U.S. Cl. .......................... 455/504; 343/796; 343/822; 342/363
[58] Field of Search ................................. 455/52.1, 107, 455/110, 504; 342/361, 363, 365; 343/796, 797, 810, 816, 895, 822, 860

[56] References Cited

U.S. PATENT DOCUMENTS

| 4,242,661 | 12/1980 | Henoch et al. | ......................... 340/994 |
| 4,494,117 | 1/1985 | Coleman | ................................. 342/365 |
| 4,742,354 | 5/1988 | Wen et al. | ............................... 342/365 |
| 5,483,680 | 1/1996 | Talbot | ..................................... 455/107 |

FOREIGN PATENT DOCUMENTS 2-291731  12/1990  Japan .

*Primary Examiner*—William A. Cuchlinski, Jr.
*Assistant Examiner*—Gertrude Arthur
*Attorney, Agent, or Firm*—Blakely Sokoloff Taylor & Zafman

[57] ABSTRACT

In a short wave transmission method, a carrier in a short wave band is circularly polarized and radiated from an antenna, thereby removing an influence of fading. A short wave transmission apparatus has a transmission apparatus including a carrier generation unit, a subcarrier generation unit, a first mixer, a phase shifter, a second mixer, and two orthogonal dipole antennas. The carrier generation unit generates a carrier in a short wave band. The subcarrier generation unit generates a subcarrier. The first mixer receives the carrier and the subcarrier. The phase shifter phase-shifts the subcarrier generated from the subcarrier generation unit by $\pi/2$. The second mixer receives the carrier and a subcarrier which is phase-shifted by $\pi/2$ by the phase shifter.

2 Claims, 11 Drawing Sheets

SHORT WAVE TRANSMISSION METHOD AND APPARATUS THEREFOR

BACKGROUND OF THE INVENTION

The present invention relates to an improvement of a communication system in radio transmission/reception using a short wave and, more particularly, to a short wave transmission apparatus which removes the influence of fading to allow high-quality signal transmission/reception.

As is conventionally well known, in radio communication in the short wave band, fading occurs to temporarily disable reception.

To prevent such a reception disabled state caused by fading, conventional short wave communication employs a reception system wherein an AGC circuit is arranged on the receiver side to minimize the influence of fading.

In the actual short wave communication, however, fading cannot be completely removed only by the AGC circuit. For this reason, the quality of the short wave line is largely degraded to result in a deterioration in reliability.

For example, short wave radio broadcasting uses a plurality of frequency bands (frequencies in 3-, 6-, and 9-MHz bands) for transmission. Of these frequencies, the most satisfactorily receivable frequency is selected and received in the reception site or on the receiver side.

Regardless of this problem, the short wave band is used as an important communication medium because of its excellent characteristics representing that the short wave is reflected by the ionosphere and propagates a long distance.

For example, the International Maritime Organization and the World Administrative Radio Conference have decided to introduce short wave narrow-band direct-printing telegraphy using a digital selective calling system to replace the conventional Morse communication, and are planning to use this system not only for general communication but also as a medium for search and rescue communication.

In international broadcasting as well, needless to say, the short wave band is used as an important medium.

As described above, the short wave band is useful for radio communication because of its wide coverage. Without fading, the short wave band can be used as the most excellent terrestrial link.

The present inventor has previously proposed a radio communication system which removes fading to allow high-quality signal transmission/reception (Japanese Patent Application No. 1-113192).

In this radio communication system, the plane of polarization (a vibrating direction of the electric vector) of a carrier in the short wave band is rotated at a high speed of, e.g., 100 kHz, much higher than the rotation speed at which fading is caused by the geomagnetic field, i.e., the rotation speed of the vector of an electric field passing through the ionosphere, which takes about three seconds to one minute for one revolution (⅓ to ⅟₆₀ Hz). With this processing, the influence of rotation of the plane of polarization caused by the magnetization plasma due to the geomagnetic field is removed, thereby preventing the reception disabled state caused by fading.

In the radio communication system of the prior art, as described in Japanese Patent Application 02291731 of Nippon Denshi orthogonal dipole antennas are used, and radio waves whose balanced-modulated signals are phase-shifted from each other by 90° are sent from the respective antennas (an antenna X and an antenna Y).

FIG. 8 shows the arrangement of the main part of a transmission apparatus for the radio communication system of the prior art. Referring to FIG. 8, reference numeral 1 denotes a carrier oscillator; 2, a low-frequency oscillator; 3, a 90° phase shifter; 4X and 4Y, balanced modulators (double balanced modulators); 5X, a 90° upper sideband filter (bandpass filter); 5Y, a 0° upper sideband filter (bandpass filter); 6X, a 90° lower sideband filter (bandpass filter); 6Y, a 0° lower sideband filter (bandpass filter); 7X and 7Y, SSB (upper side) transmitters; 8X and 8Y, SSB (lower side) transmitters; 9X and 9Y, output synthesizers; 10X and 10Y, baluns (antenna matching devices); 11X, an X antenna; and 11Y, a Y antenna.

In FIG. 8, the carrier oscillator 1 on the left side has a function of generating a short wave of a carrier frequency ($F_1$).

The low-frequency oscillator 2 shown on the right side of the carrier oscillator 1 generates a low-frequency signal of a frequency ($F_2$) for rotating the plane of polarization of a radio wave.

Therefore, in the balanced modulator 4Y shown on the upper side, a carrier frequency A is balanced-modulated with a low frequency B for rotating the plane of polarization of the radio wave, thereby obtaining two signals of frequencies ($F_1 \pm F_2$).

The two signals output from the balanced modulator 4Y are separated at the next stage by the 0° upper sideband filter 5Y and the 0° lower sideband filter 6Y and sent to the SSB (upper side) transmitter 7Y and the SSB transmitter (lower side) 8Y, respectively, which perform power amplification.

Thereafter, the two signals are synthesized by the output synthesizer 9Y and supplied to the Y antenna 11Y through the balun 10Y.

On the other hand, the low-frequency signal of the frequency B is input from the low-frequency oscillator 2 to the balanced modulator 4X shown on the lower side of FIG. 8 through the 90° phase shifter 3.

For this reason, two signals of frequencies ($F_1 \pm F_2$) are output, which are balanced-modulated signals with a phase shift of 90° with respect to the balanced-modulated frequencies ($F_1 \pm F_2$) output from the balanced modulator 4Y.

The two signals output from the balanced modulator 4X are also separated at the next stage by the 90° upper sideband filter 5X and the 90° lower sideband filter 6X and sent to the SSB transmitter (upper side) 7X and the SSB transmitter (lower side) 8X, respectively, which perform power amplification.

Thereafter, the two signals are synthesized by the output synthesizer 9X and supplied to the X antenna 11X through the balun 10X.

Therefore, one pair of in-phase balanced-modulated waves which have a phase shift of 90° with respect to the other pair of balanced-modulated waves and the same carrier frequency A are supplied to the corresponding orthogonal dipole antenna (Y or X) shown on the right side of FIG. 8, and radiated from the Y antenna 11Y or the X antenna 11X.

The waveforms of signals radiated from the dipole antennas (Y and X) will be described below.

FIG. 9 shows the waveforms of signals radiated from the dipole antennas in the radio communication system of the prior art.

FIG. 10 shows a view plotted using a computer, which shows a state wherein the plane of polarization is rotated when radio waves shown in FIG. 9 are radiated from the orthogonal antennas.

Radio waves having waveforms as shown in FIG. 9 are radiated from the orthogonal dipole antennas. In this case, the plane of polarization as a synthesized vector is rotated at a speed of, e.g., θ/2π (=1/F$_2$) per second.

As is apparent from FIG. 10, these radio waves are rotated as the synthesized vector of the radio waves radiated from the orthogonal antennas X and Y in accordance with output currents i$_x$ and i$_y$ and propagate in a Z direction.

The plane of polarization is normally rotated once in several seconds to one minute. However, in the radio communication system shown in FIG. 8, the plane of polarization is rotated at a high speed of, e.g., about θ/2π per second, so that the influence of the geomagnetic field can be ignored.

The frequency of the rotating radio wave is F, and the amplitude A is constant.

A change in frequency (spectrum) and phase of each signal passing through the blocks of the transmission apparatus shown in FIG. 8 will be described below using equations.

FIG. 11 explains a change in frequency (spectrum) and phase of each signal passing through the blocks of the transmission apparatus shown in FIG. 8 using equations. The same reference numerals as in FIG. 8 denote the same blocks in FIG. 11, and DBM represents a balanced modulator (double balanced modulator).

In FIG. 11, the frequency of a carrier output from the carrier oscillator 1 is F$_1$, the amplitude of the carrier is A, the frequency of a low-frequency signal output from the low-frequency oscillator 2 to rotate the plane of polarization of the radio wave is F$_2$, and the amplitude of the low-frequency signal is B. A voltage of about 100 mV is appropriate for the amplitude A of the carrier, and a voltage of about 10 mV is appropriate for the amplitude B of the low-frequency signal.

The angular frequency of the carrier is ω, the angular frequency of the low-frequency signal (corresponding to the angular frequency of rotation of the plane of polarization) is θ, and 90° is represented as π/2.

In this case, the carrier (short wave) output from the carrier oscillator 1 is represented as follows:

$$\text{short wave carrier } F_1 = A \cdot \sin\omega t \tag{1}$$

The low-frequency signal output from the low-frequency oscillator 2 is represented as follows:

$$\text{low-frequency signal } F_2 = B \cdot \cos\omega t \tag{2}$$

Therefore, the two signals represented by equations (3) and (4) are output from the balanced modulator 4Y and input to the 0° upper sideband filter 5Y and the 0° lower sideband filter 6Y.

Frequencies F$_{11}$ and F$_{12}$ of these signals are represented as follows:

$$F_{11} = C \cdot \sin(\omega+\theta)t \tag{3}$$

$$F_{12} = C \cdot \sin(\omega-\theta)t \tag{4}$$

where C is a voltage amplitude attenuated upon modulation and almost equal to B.

The two signals represented by equations (3) and (4) are sent to the SSB transmitter (upper side) 7Y and the SSB transmitter (lower side) 8Y. Upon power amplification, the amplitude is increased to M, so that the signal frequencies are converted as represented by equations (5) and (6):

$$F_{11} = M \cdot \sin(\omega+\theta)t \tag{5}$$

$$F_{12} = M \cdot \sin(\omega-\theta)t \tag{6}$$

Thereafter, the two signals are synthesized (added) by the output synthesizer 9Y to generate a signal represented by equation (7):

$$F_{11}+F_{12} = M \cdot \sin(\omega+\theta)t + M \cdot \sin(\omega-\theta)t \tag{7}$$

On the other hand, a low-frequency signal represented by equation (8) is input from the 90° phase shifter 3 to the balanced modulator 4X shown on the lower side of FIG. 11:

$$F_2 = B \cdot \cos(\omega-\pi/2) \tag{8}$$

Therefore, two signals output from the balanced modulator 4X are represented as follows:

$$F_{21} C \cdot \sin\{(\omega+\theta)t - \pi/2\} \tag{9}$$

$$F_{22} C \cdot \sin\{(\omega-\theta)t - \pi/2\} \tag{10}$$

The signals represented by equations (9) and (10) are separated by the 90° upper sideband filter 5X and the 90° lower sideband filter 6X and sent to the SSB transmitter (upper side) 7X and SSB transmitter (lower side) 8X, respectively. After power amplification, the two signals are synthesized (added) by the output synthesizer 9X to generate a signal represented by equation (11):

$$F_{21}+F_{22} = M \cdot \sin\{(\omega+\theta)t - \pi/2\} + M \cdot \sin\{(\omega-\theta)t - \pi/2\} \tag{11}$$

In this manner, the signal represented by equation (7) is generated by the output synthesizer 9Y and output to one (Y antenna 11Y) of the orthogonal dipole antennas through the balun 10Y while the signal represented by equation (11) is generated by the output synthesizer 9X and output to the other dipole antenna (X antenna 11X) through the balun 10X.

Therefore, a signal whose plane of polarization is rotated by θt is radiated from the orthogonal dipole antennas.

FIG. 12 shows the waveforms of the short wave signals radiated from the prior art orthogonal dipole antennas 11X and 11Y shown in FIG. 8. The 10Y output is the signal output from the balun 10Y, and the 10X output is the signal output from the balun 10X.

The signals having the waveforms as shown in FIG. 12, i.e., the short wave signals whose planes of polarization are rotated by θt are radiated from the dipole antennas.

When these radio waves are received by a reception antenna, and only the upper sideband is selected by a receiver, a signal without fading represented by equation (12) is obtained:

$$F = M \cdot \sin\{(\omega+\theta \pm p)t\} \tag{12}$$

In equation (12), the small increase and decrease in angular frequency of rotation of the plane of polarization, which are caused in the ionosphere are represented by Ip.

As described above, in the radio communication system of the prior art, two balanced-modulated radio waves, i.e., two balanced-modulated radio waves of angular frequencies (ω+θ) and (ω−θ) are generated on the transmission side, and only one of them is received on the reception side.

On the reception antenna, two high-frequency currents having angular frequencies (ω+θ) and (ω−θ) and the same amplitude are induced and interfere each other, thereby forming the balanced-modulated waves.

FIG. 13 shows the interference waveform between currents which are induced on the reception antenna by the radio waves whose planes of polarization are rotated. Referring to FIG. 13, a, b, and c represent phase shift points.

This interference waveform is the same as a waveform obtained by balanced-modulating an arrival wave [k·A·sinωt] by [cosωt].

At the points a, b, and c, the envelope crosses the X-axis, where the phase is shifted by 180°.

The amplitude of the current at the phase shift point is "0", and the amplitude near the phase shift point is almost "0".

Two phase shift points are generated every θ/2π. If the plane of polarization is rotated at a low speed such as one revolution per second, a long dead period of several seconds is generated at the phase shift point.

On the other hand, only polarization fading is considered as a possible cause for deep fading which periodically disables reception by a receiver having an AGC function.

The reason for this is as follows. A receiver with a high sensitivity for radio communication requires an input voltage of about 0 dBµV to obtain a reception output of 50 mW at an S/N ratio of 20 dB in the short wave band. Therefore, it can be said that the reception output cannot be perceived due to fading when the input level to the receiver decreases to −14 dBµV because the S/N ratio decreases to, e.g., about 6 dB at this time.

If dipole antennas are used as reception antennas, reception is disabled when the field strength decreases to −26 dBµV/m at an average gain of about 12 dB, though it depends on the frequency.

In the radio communication system of the prior art, to remove the influence of polarization fading, the vector of the electric field passing through the ionosphere is rotated at a high speed of, e.g., 100 kHz, much higher than the speed of Faraday rotation which takes three seconds to one minute for one revolution (⅓ to ¹⁄₆₀ Hz).

The two frequencies forming the balanced-modulated wave are detuned from the carrier frequency by ±(θ/2π) Hz on the upper and lower sides. Therefore, the interval between the two frequencies is (θ/π) Hz.

When the two frequencies are detuned by, e.g., 12 kHz, θ must be about 37.7 krad. In this case, the plane of polarization is rotated at about 6 kHz.

However, if the wave with a rotating plane of polarization has an occupied bandwidth of 6 kHz in accordance with modulation, the entire occupied bandwidth becomes 18 kHz.

The present radio regulation provides that the permissible occupied bandwidth in the short wave band is 6 kHz or less for radio stations except broadcasting stations.

Therefore, the radio communication system of the prior art, i.e., the communication system in which the plane of polarization of a radio wave is rotated at a high speed to remove fading is inconsistent with the regulations.

The radio communication system of the prior art, i.e., the communication system in which the plane of polarization of a radio wave is rotated at a high speed to remove fading is inconsistent with the existing regulations. This problem becomes a large obstacle in putting the system into practice for normal radio stations.

SUMMARY OF THE INVENTION

The present invention has been made to solve the above problem, and has as its object to provide transmission method and apparatus which remove fading to allow high-quality transmission/reception in radio communication in the short wave band which is an important medium used for short wave narrow-band direct-printing telegraphy in maritime communication, general communication, search and rescue communication, and international broadcasting.

In order to achieve the above object according to an aspect of the present invention, there is provided a short wave transmission method comprising the steps of circularly polarizing a carrier in a short wave band and radiating the carrier from an antenna, thereby removing an influence of fading.

According to another aspect of the present invention, there is provided a short wave transmission apparatus having a transmission apparatus comprising carrier generation means for generating a carrier in a short wave band, subcarrier generation means for generating a subcarrier, a first mixer for receiving the carrier and the subcarrier, a phase shifter for phase-shifting the subcarrier generated from the subcarrier generation means by π/2, a second mixer for receiving the carrier and a subcarrier which is phase-shifted by π/2 by the phase shifter, and two orthogonal dipole antennas, wherein an output from the first mixer is input to one of the two dipole antennas, and an output from the second mixer is input to the other of the two dipole antennas, thereby radiating a circularly polarized wave.

The basic principle of the present invention will be described below.

The present inventor was convinced from theoretical calculations and a lot of experimental results that, when the radio communication system of the prior art was implemented, the influence of fading could be technically removed to allow high-quality signal transmission/reception.

To put this radio communication system into practice, a system usable within the limitation of the permissible occupied bandwidth in the short band, which is consistent with the existing radio regulations, i.e., the permissible occupied bandwidth of 6 kHz or less (for radio stations except broadcasting stations) must be realized.

In FIG. 11, the change in frequency (spectrum) and phase of each signal passing through the blocks of the transmission apparatus shown in FIG. 8 has been described using equations.

In FIG. 11, the angular frequency of a carrier is ω, and the angular frequency of the low-frequency signal (corresponding to the angular frequency of rotation of the plane of polarization) is θ.

More specifically, theoretical calculations and experiments were conducted by setting θ (corresponding to the angular frequency of rotation of the plane of polarization) =the value of the angular frequency ω of the carrier.

In this case, the relationship between the change in frequency (spectrum) and the change in phase of each signal passing through the blocks will be described below in correspondence with FIG. 11.

FIG. 2 explains a change in frequency (spectrum) and phase of each signal passing through the blocks when the angular frequency θ of rotation of the plane of polarization of a radio wave is set to be equal to the angular frequency ω of the carrier in the present invention. The same reference numerals as in FIG. 8 or 11 denote the same parts in FIG. 2.

FIG. 2 corresponds to FIG. 11 and shows a case wherein θ=ω.

For this reason, the low-frequency signal output from the low-frequency oscillator 2 is represented by equation (13) instead of equation (2):

$$\text{low-frequency signal } F_2 = B \cdot \cos\omega t \tag{13}$$

Therefore, two signals represented by equations (14) and (15) are output from the balanced modulator 4Y shown on the upper side of FIG. 2 and input to the 0° upper sideband filter 5Y and the 0° lower sideband filter 6Y, respectively:

$$F_{11} = C \cdot \sin(\omega + \omega)t \tag{14}$$

$$F_{12} = C \cdot \sin(\omega - \omega)t \tag{15}$$

Equation (14) corresponds to equation (3) where $\theta = \omega$. Similarly, equation (15) corresponds to equation (4) where $\theta = \omega$.

Since the latter equation (15) is "0", the signal input to the 0° lower sideband filter 6Y becomes "0". Therefore, the signal component power-amplified by the SSB (lower side) transmitter BY also becomes "0".

For this reason, only the signal represented by equation (14), which is output from the balanced modulator 4Y, i.e., only the signal power-amplified by the SSB (upper side) transmitter 7Y is synthesized (added) by the output synthesizer 9Y to generate a signal represented by equation (16):

$$F_{11} = M \cdot \sin(\omega + \omega)t = M \cdot \sin\omega t \tag{16}$$

A low-frequency signal represented by equation (17) is input from the 90° phase shifter 3 to the balanced modulator 4X shown on the lower side:

$$F_2 = B \cdot \cos(\omega t - \pi/2) \tag{17}$$

Therefore, the two signals output from the balanced modulator 4X are represented as follows:

$$F_{21} = C \cdot \sin\{(\omega + \omega)t - \pi/2\} \tag{18}$$

$$F_{22} = C \cdot \sin\{(\omega - \omega)t - \pi/2\} \tag{19}$$

In this case, the latter equation (19) is converted to equation (20):

$$\begin{aligned} F_{22} &= C \cdot \sin\{(\omega + \omega)t - \pi/2\} \\ &= C \cdot \sin(-\pi/2) \\ &= -C \end{aligned} \tag{20}$$

As a result, the signal input to the 90° lower sideband filter 6X becomes a constant "−C", which is independent of the angular frequency $\omega$ of the carrier or rotation of the plane of polarization.

Therefore, the signals represented by equations (18) and (20), i.e., the signals sent to the SSB (upper side) transmitter 7X and the SSB (lower side) transmitter 8X, power-amplified, and synthesized (added) by the output synthesizer 9X at the next stage, thereby generating a signal represented by equation (21):

$$\begin{aligned} F_{21} + F_{22} &= M \cdot \sin\{(\omega + \omega)t - \pi/2\} + \\ &\quad M \cdot \sin\{(\omega - \omega)t - \pi/2\} \\ &= M \cdot \sin(2\omega t - \pi/2) + M \cdot \sin(-\pi/2) \\ &= M \cdot \sin(2\omega t - \pi/2) + M \cdot (-1) \\ &= M \cdot \sin(2\omega t - \pi/2) - M \end{aligned} \tag{21}$$

The signal represented by equation (21) is a substantially circularly polarized wave which is decentered because the value of the second term is independent of t.

In this manner, according to the transmission apparatus shown in FIG. 2, the signal represented by equation (16) is generated by the output synthesizer 9Y and output to one (Y antenna 11Y) of the orthogonal dipole antennas through the balun 10Y while the signal represented by equation (21) is generated by the output synthesizer 9X and output to the other dipole antenna (X antenna 11X) through the balun 10X.

The signals output from the two baluns 10Y and 10X are equalized with the carrier which is phase-shifted by 90°.

Therefore, a signal whose plane of polarization is rotated by the angular frequency $\omega$ is radiated from the orthogonal dipole antennas.

From the above analysis result, it was proved that, when the angular frequency $\omega$ of the carrier was equalized with the angular frequency $\theta(=\omega)$ of the low-frequency signal for rotating the plane of polarization of a radio wave, the carrier of the angular frequency $\omega$ was rotated at a high speed and eventually radiated as a circularly polarized wave of an angular frequency $2\omega$.

In this case, the signals supplied to the elements of the orthogonal dipole antennas, i.e., the Y antenna 11Y and the X antenna 11X are not balanced-modulated waves. Therefore, no balanced-modulated wave is generated on the reception antenna in the electric field radiated from these antennas 11Y and 11X, so no fading occurs.

In the radio communication system of the above-described prior art, two radio waves are present. In this case, however, one circularly polarized wave is used. For this reason, the spectrum of one of the radio waves is erased, so that the occupied bandwidth can be set within the range of regulation values.

On the basis of this recognition, of the blocks in FIG. 2, as for the Y wave on the upper side, the 0° lower sideband filter 6Y and the SSB (lower side) transmitter 8Y to which a signal of "0" is input are not needed. As for the X wave on the lower side, the 90° lower sideband filter 6X and the SSB (lower side) transmitter 8X, which have only a function of slightly shifting the center of rotation to the left side because the constant −M is independent of t, are not functionally needed.

For this reason, when the substantially insignificant blocks are removed, a transmitter apparatus shown in FIG. 1 (to be described later) can be constituted.

The short wave transmission apparatus of the present invention substantially removes fading which is conventionally regarded as inevitable, thereby allowing high-quality radio communication. At the same time, the short wave transmission apparatus is highly practical because the permissible occupied frequency in the short wave band is consistent with the existing radio regulations.

In the present invention, to solve the problem of the radio communication system of the prior art, i.e., the problem that two radio waves are necessary for one-line communication, and the permissible occupied bandwidth inconsistent with the existing radio regulations impedes practical use, the plane of polarization of a radio wave is rotated with the same frequency as that of the carrier, thereby allowing transmission/reception using only one radio wave.

In addition, since only the apparatus on the transmission side is improved, the conventional short wave reception function suffices on the reception side. Without fading, power saving can be achieved with a small power consumption.

DESCRIPTION OF THE PREFERRED EMBODIMENTS

[First Embodiment]

A short wave transmission apparatus according to the first embodiment of the present invention will be described below in detail with reference to the accompanying drawings.

The first embodiment corresponds to claim 2.

Figure 1:
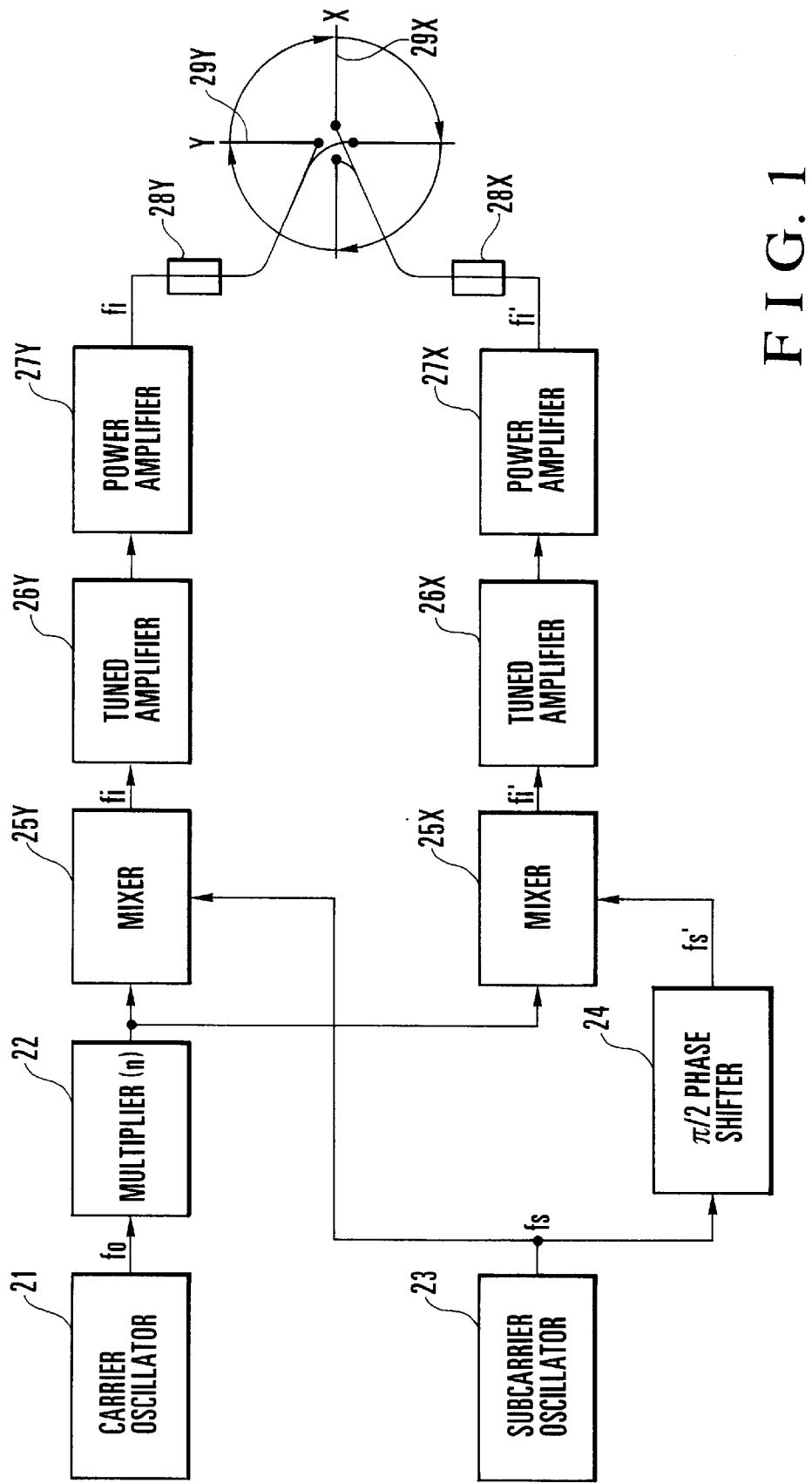
FIG. 1 is a block diagram showing the arrangement of the main part of a short wave transmission apparatus according to the first embodiment of the present invention.
Figure 2:
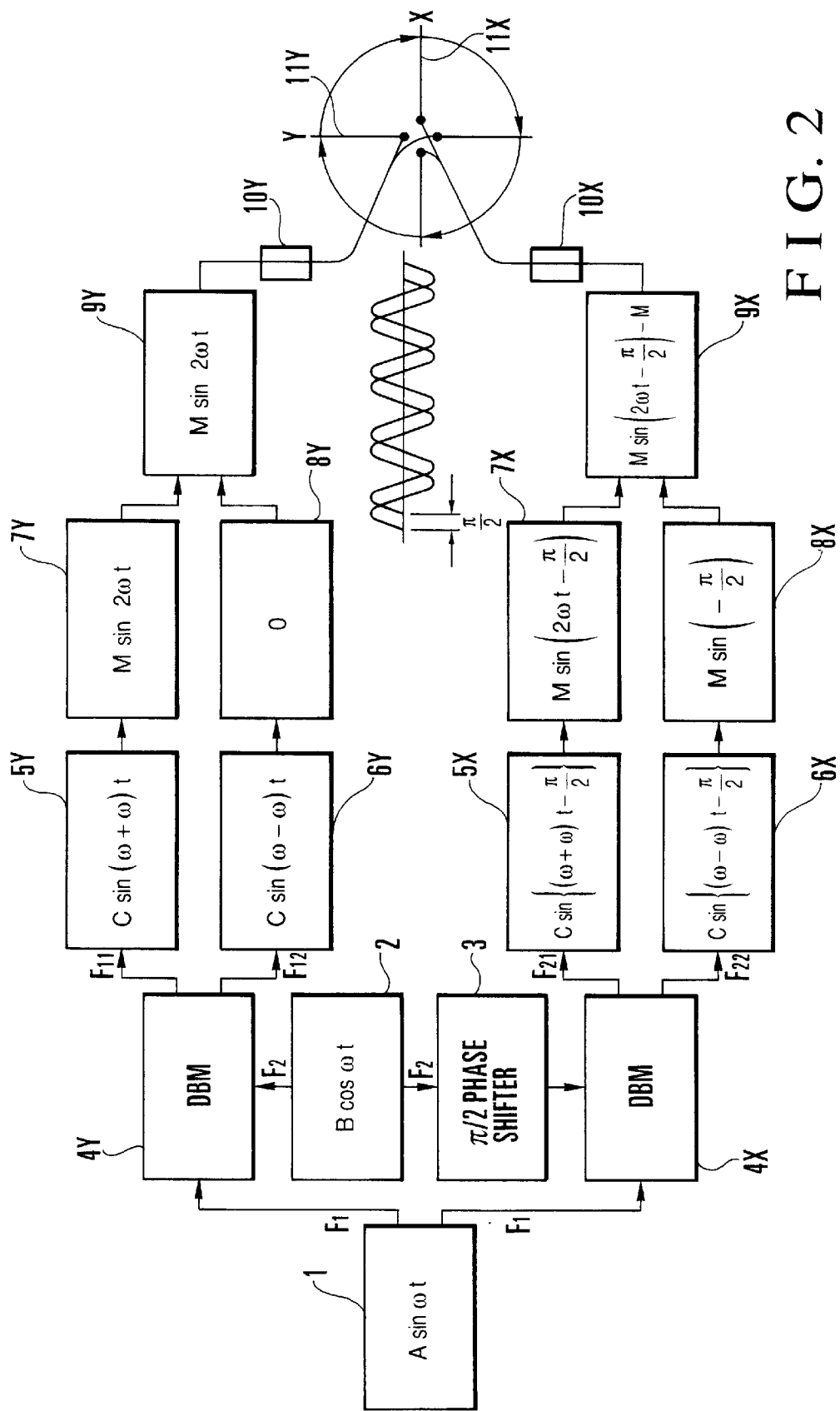
FIG. 2 is a block diagram for explaining a change in frequency (spectrum) and phase of each signal passing through the blocks by using equations, in which an angular frequency θ of rotation of the plane of polarization of a radio wave is equalized with an angular frequency ω of a carrier in the present invention.

FIG. 1 shows the arrangement of the main part of the short wave transmission apparatus according to the first embodiment of the present invention. Referring to FIG. 1, reference numeral 21 denotes a carrier oscillator; 22, a multiplier; 23, a subcarrier oscillator; 24, a π/2 phase shifter; 25X and 25Y, mixers; 26X and 26Y, tuned amplifiers; 27X and 27Y, power amplifiers; 28X and 28Y, baluns; 29X, an X antenna; and 29Y, a Y antenna. Reference symbol $f_o$ denotes a carrier frequency; $f_s$, a subcarrier frequency; $f_s$, an output frequency of a subcarrier which is phase-shifted by π/2 by the π/2 phase shifter 24; $f_i$, an output frequency from the mixer 25Y, which corresponds to an output frequency from the power amplifier 27Y; $f_{i'}$, an output frequency from the mixer 25X, which corresponds to an output frequency from the power amplifier 27X; and n, a multiplication factor of the frequency multiplier 22.

A carrier of the frequency $f_o$ is output from the carrier oscillator 1 shown on the left side of FIG. 1 and multiplied by n by the frequency multiplier 22 at the next stage to generate a carrier in the short wave band.

The carrier multiplied by n is input to the mixers 25Y and 25X.

A subcarrier of the subcarrier frequency $f_s$ is output from the subcarrier oscillator 23 and input to the mixer 25Y and the π/2 phase shifter 24.

On the upper side associated with a Y wave, a signal of the output frequency $f_i=(f_o \times n)-f_s$ is generated from the mixer 25Y. The signal is amplified by the tuned amplifier 26Y and the power amplifier 27Y and supplied to the Y antenna 29Y through the balun 28Y.

On the lower side associated with an X wave, the carrier multiplied by n and the subcarrier of the output frequency $f_{s'}$, which is phase-shifted by π/2 are input to the mixer 25X to generate a signal of the output frequency $f_{i'}=(f_o \times n)-f_{s'}$.

The signal of the output frequency $f_{i'}$ is amplified at the next stage by the tuned amplifier 26X and the power amplifier 27X and supplied to the X antenna 29X through the balun 28X.

Therefore, a circularly polarized wave of a frequency $f_i$ is radiated from the Y antenna 29Y and the, X antenna 29X of the orthogonal dipole antennas.

Since the circularly polarized radio wave has a single spectrum, the occupied bandwidth is smaller than that in the radio communication system of the prior art and sufficiently consistent with the existing radio regulations.

Therefore, when the circularly polarized wave radiated from the orthogonal dipole antennas is received, a high-quality short wave without fading can be received.

In FIG. 1, to generate the carrier (frequency $f_i$) as a reference, the carrier oscillator 21 and the frequency multiplier 22 are arranged. However, a synthesizer oscillator or the like can also be used, as a matter of course.

As described above, the radio communication system and transmission apparatus of the present invention have a very simple arrangement. In addition, this system is not influenced by fading, unlike the prior art.

Furthermore, this system is sufficiently consistent with the existing radio regulations, and particularly, the regulations of the permissible occupied bandwidths.

Therefore, this system can be optimally used for radio communication in the short wave band which is important for maritime communication or international broadcasting, and its practical effect is conspicuous.

Experimental Example

In an experiment, the Y antenna 29Y and the X antenna 29X, which are orthogonal to each other, were excited by carrier currents (in the short wave band) accurately phase-shifted from each other by π/2.

For a facsimile apparatus, frequency shift signals of ±400 Hz having a center frequency corresponding to the carrier frequency were used. A shift signal of −400 Hz represented "black", and a shift signal of +400 Hz represented "white".

One horizontal scanning period was set at one second, and the index of cooperation was set at 576, which is a constant defined as the WMO standard in a short wave facsimile apparatus.

A pulse of 500 ms corresponding to ½ the horizontal scanning period on the image transmission side was generated by dividing another accurate oscillation frequency, and the transmission output on the X antenna side was intermittently switched.

According to this method, a linear polarized wave and a circularly polarized wave are sequentially switched every 500 ms and transmitted. Therefore, when these radio waves are received by the facsimile apparatus, the linear polarized wave reception portion and the circularly polarized wave reception portion are separated to the left and right sides on the received image.

At the same time, when the reception antenna output voltages are continuously recorded, the influences of fading in the two waves can be compared and observed.

The transmission frequency was set within the range of 10.100 MHz to 10.150 MHz. Powers radiated from the two dipole antennas were accurately adjusted at an equal level of about 75 W.

The reception site was separated from the transmission site by about 350 km, where it was expected that, in this frequency band, the direct wave had no coverage although the main path of an ionospheric wave had satisfactorily coverage, and the multipath of a multiple reflection wave could also be received (Tokyo and Yokkaichi-shi in Mie Prefecture)

At the reception site, a λ/2 dipole antenna was extended, drawn into the room through a coaxial cable, halved by a divider, and connected to a facsimile receiver and a short wave receiver.

The facsimile receiver was used to receive a transmitted image, and the short wave receiver was used to simultaneously measure the antenna output voltage.

An image was received while sequentially switching between the linear polarized wave and the circularly polarized wave. The image of the circular polarized wave had very high quality. However, the image of the linearly polarized wave had almost unreadable image portions due to fading.

Experiments were conducted while changing the form of the transmission radio wave.

Figure 3:
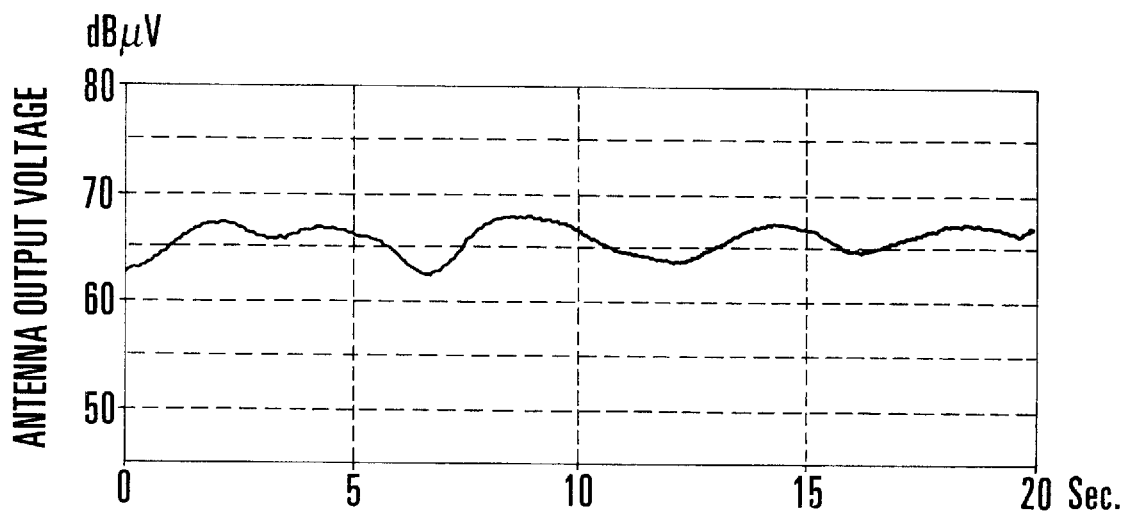
FIG. 3 is a graph showing an experimental result, which shows a change in reception antenna output voltage caused by a circularly polarized/unmodulated radio wave.

FIG. 3 shows an experimental result, which shows a change in reception antenna output voltage caused by the circularly polarized/unmodulated radio wave. Time is plotted along the abscissa, and the antenna output voltage is plotted along the ordinate.

Figure 4:
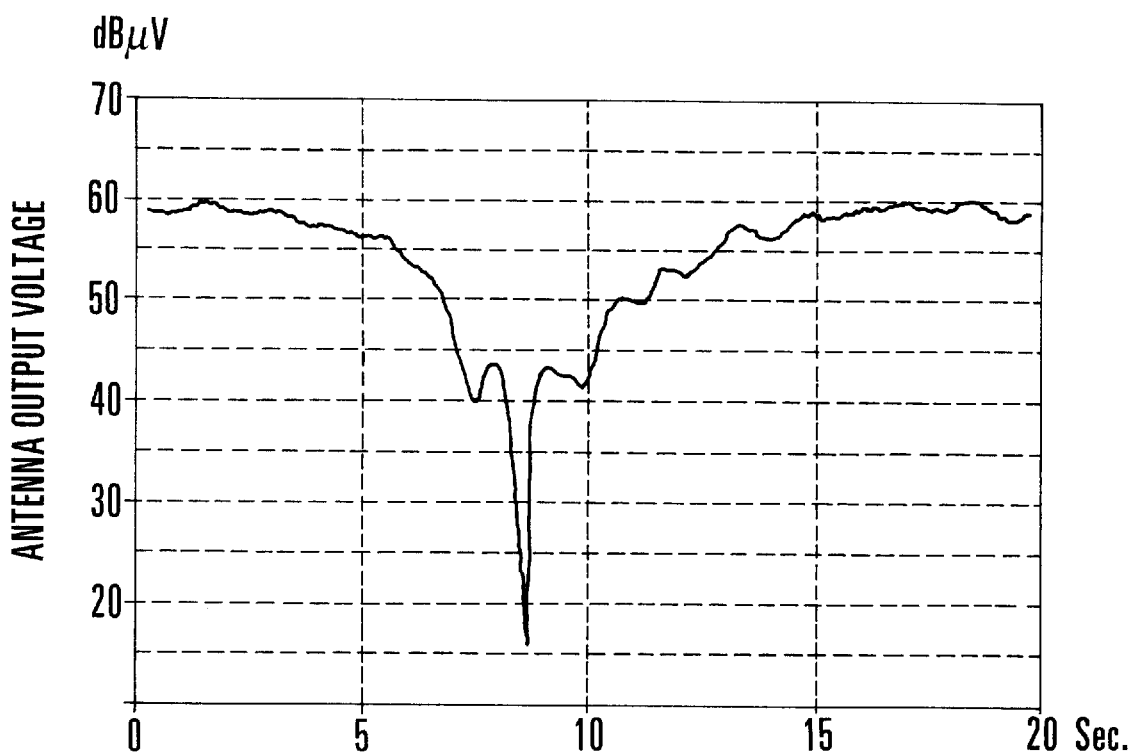
FIG. 4 is a graph showing an experimental result, which shows a change in reception antenna output voltage caused by a linearly polarized/unmodulated radio wave of the prior art.

FIG. 4 shows an experimental result, which shows a change in reception antenna output voltage caused by the linearly polarized/unmodulated radio wave. Plotting along the abscissa and ordinate is the same as in FIG. 3.

As is apparent from comparison between FIGS. 3 and 4, the variation in reception antenna output voltage in FIG. 3 showing transmission/reception using the circularly polarized wave is much smaller than that in FIG. 4.

Therefore, it was confirmed that the influence of fading was largely decreased to allow practical high-quality transmission/reception.

Figure 5:
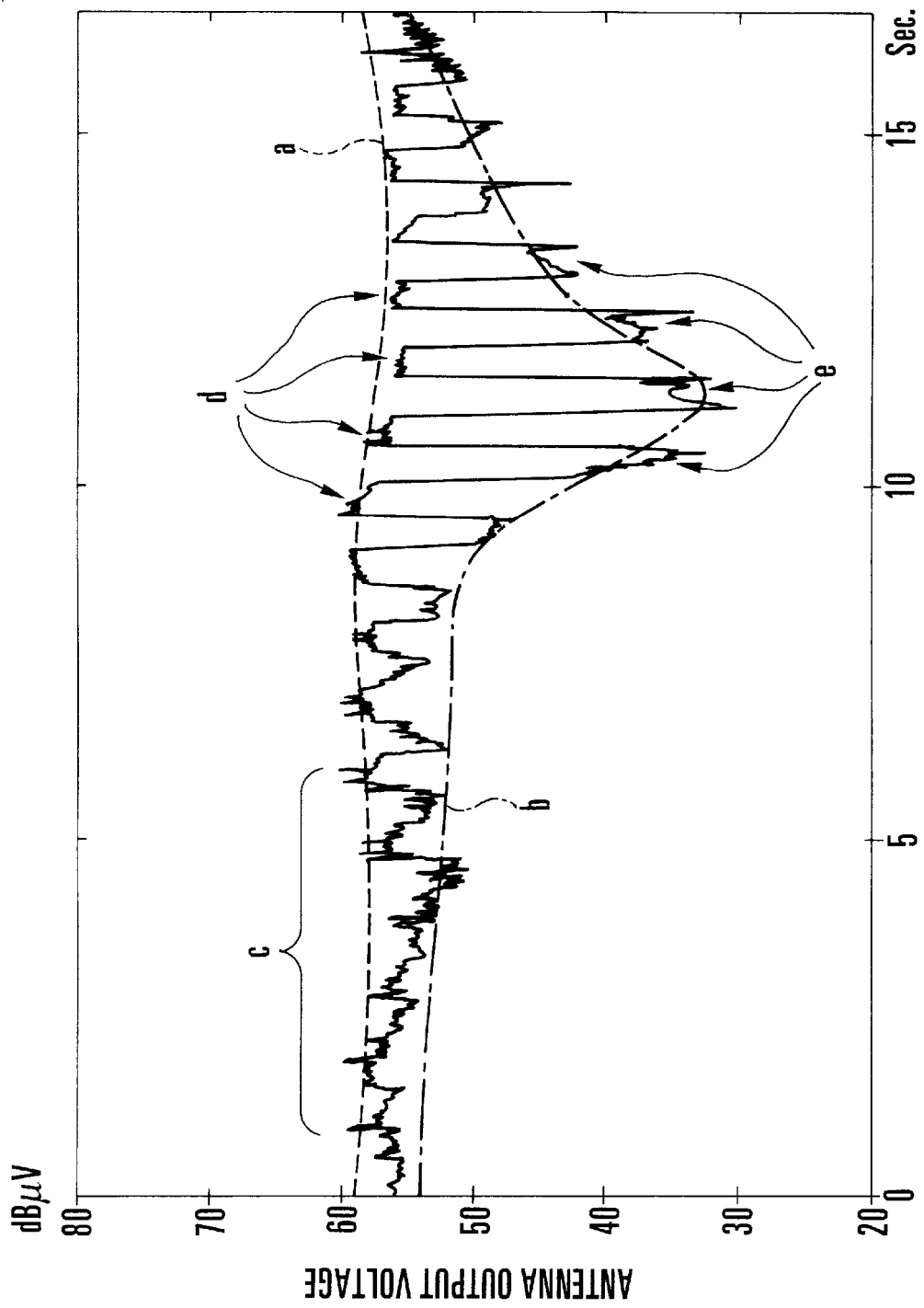
FIG. 5 is a graph showing an experimental result, which shows reception antenna output voltages at the fading points of a circularly polarized wave and a linearly polarized wave.

FIG. 5 shows an experimental result, which shows reception antenna output voltages at the fading points of a circularly polarized wave and a linearly polarized wave. Time is plotted along the abscissa, and the reception antenna output voltage is plotted along the ordinate. A broken line a indicates an estimated output level in transmission using only the circularly polarized wave; a chain line b, an estimated output level in transmission using only the linearly polarized wave; c, a transmission portion without fading; d, the circularly polarized wave transmission portion; and e, a linearly polarized wave transmission portion.

In FIG. 5, the circularly polarized wave and the linearly polarized wave shown in FIGS. 3 and 4 were alternately transmitted for 500 ms.

The transmission portion c shown on the left side has the same level as that of the circularly polarized wave because no fading occurs in the linearly polarized wave.

The low level portion e shown on the right side is the linearly polarized wave transmission portion with fading.

The portion d with a minimum level change on the right side is the circularly polarized wave transmission portion.

As is apparent from FIG. 5, fading occurs in the linearly polarized wave transmission portion, although no fading occurs in the circularly polarized wave transmission portion.

Each tooth of the comb-like shape (transmission time of the portion d or e) corresponds to 500 ms along the time axis.

The reason why the level decreases at the linearly polarized wave portion (portion e) is that the plane of polarization of the radio wave arriving at the reception antenna is rotated due to rotation of the plane of polarization caused in the ionosphere.

The level changes by 26 to 30 dB from the maximum level although the level of the circularly polarized wave portion changes only about 6 dB.

The data in FIG. 5 was obtained by calibrating the relationship between the input voltage to the receiver for measurement and the AGC voltage with a measurement result obtained using a standard signal generator and an experimental frequency.

From the above experimental result, it was proved that circularly polarized wave transmission was more stable against the influence of fading than linearly polarized wave transmission.

Therefore, it was confirmed that the short wave transmission apparatus according to the present invention was stable against the influence of fading, and the occupied bandwidth was consistent with the existing radio regulations.

As the modulation method for a facsimile apparatus, the frequency modulation method (e.g., signals for discriminating "white" and "black" are transmitted within the range of ±400 Hz) is optimally used. However, the present invention can also be applied to the normal amplitude modulation method or another known modulation method.

As described above, in the conventional short wave broadcasting, a plurality of frequency bands are simultaneously used for transmission, and one frequency with minimum fading is selected and received, thereby avoiding the influence of fading. However, according to the short wave transmission apparatus of the present invention, high-quality transmission/reception can be performed using only one frequency with sufficient coverage.

In short wave broadcasting, no radio wave can be received within a range of, e.g., about 100-km radius. However, when a total of only two stations are set, i.e., when one station is placed in Kanto area, and the other is placed separated therefrom by 100 km or more, all areas in Japan can be covered.

In this case, a transmission output of 10 kW or more is conventionally required. However, for the short wave transmission apparatus of the present invention, a transmission output of ⅒ that of the prior art, i.e., a transmission output of about 1 kW suffices. Therefore, power saving or size reduction of equipment can be achieved with a small power consumption.

[Second Embodiment]

The second embodiment will be described below.

This embodiment corresponds to claim 3.

Figure 6:
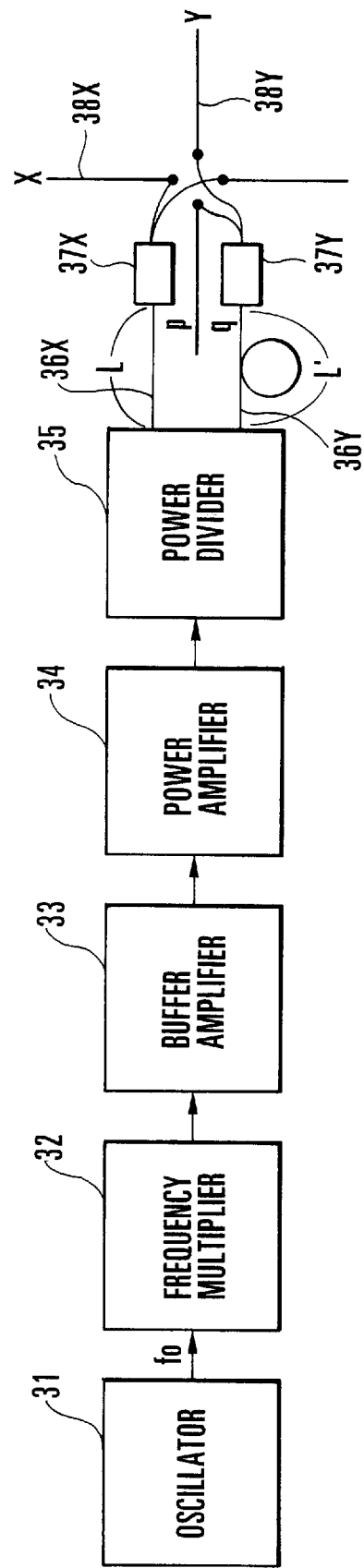
FIG. 6 is a block diagram showing the arrangement of the main part of a short wave transmission apparatus according to the second embodiment of the present invention.

FIG. 6 shows the arrangement of the main part of a short wave transmission apparatus according to the second embodiment of the present invention. Referring to FIG. 6, reference numeral 31 denotes an oscillator; 32, a frequency multiplier; 33, a buffer amplifier; 34, a power amplifier; 35, a power divider; 36X and 36Y, coaxial cables; 37X and 37Y, baluns; 38X, an X antenna; and 38Y, a Y antenna. Reference symbol $f_o$ denotes an oscillation frequency; L, a length of the coaxial cable 36X; L', a length of the coaxial cable 36Y; and p and q, contacts.

In the short wave transmission apparatus shown in FIG. 6, a circularly polarized wave is transmitted from a single transmission apparatus through the X antenna 38X and the Y antenna 38Y, which are orthogonal to each other.

When a signal generated from the oscillator 31 has the oscillation frequency $=f_o$, i.e., $\omega_o=2\pi f_o$, and the amplitude is A, an oscillation current $i_o$ is represented as follows:

$$i_o = A \cdot \sin(\omega_o \cdot t) \tag{22}$$

This signal is output to the frequency multiplier 32 at the next stage. When the multiplication factor is n, a multiplied frequency $f_c=n \cdot f_o$, and $\omega_c=2\pi f_c$. When the amplitude is B, a current $i_1$ is represented as follows:

$$i_1 = B \cdot \sin(\omega_c \cdot t) \tag{23}$$

Thereafter, the signal of the frequency $f_c$ is amplified by the buffer amplifier 33 and the power amplifier 34. When the amplitude at the last stage is C, a transmission carrier current $i_c$ is represented as follows:

$$i_c = C \cdot \sin(\omega_c \cdot t) \tag{24}$$

The power divider 35 at the next stage halves the input power, so that the amplitude of each current becomes $C/\sqrt{2}$.

When currents supplied to the coaxial cables 36X and 36Y are $i_{c1}$ and $i_{c2}$, respectively, $$i_{c1} = i_{c2} = c/(\sqrt{2}) \cdot \sin(\omega_c \cdot t) \tag{25}$$

When the length of one coaxial cable, e.g., the coaxial cable 36X is L, the length L' of the other coaxial cable 36Y is represented as follows:

$$L' = L + \lambda/4 \tag{26}$$

where $\lambda$ is the wavelength.

In this manner, the length of one of the pair of coaxial cables 36X and 36Y is delayed by $1/\lambda$. When the current $i_{c1}$ at the contact p is represented as follows:

$$i_{c1} \approx c/(\sqrt{2}) \cdot \sin(\omega_c \cdot t) \tag{27}$$

the current $i_{c2}$ at the other contact q is represented as follows:

$$i_{c1} \approx c/(\sqrt{2}) \cdot \cos(\omega_c \cdot t) \tag{28}$$

so that a circularly polarized wave is generated.

[Third Embodiment]

The third embodiment will be described below.

This embodiment corresponds to claim 5.

Figure 7:
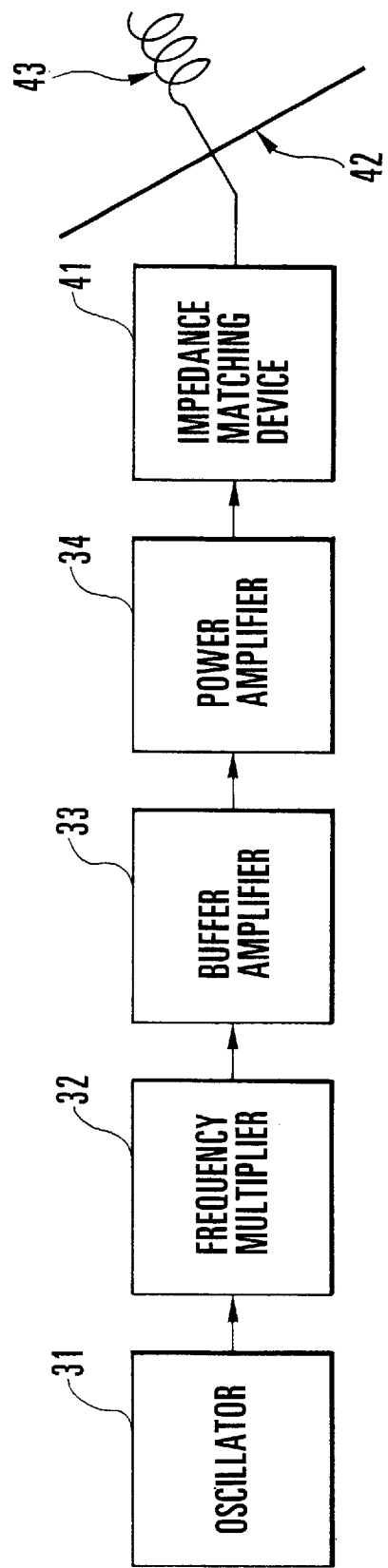
FIG. 7 is a block diagram showing the arrangement of the main part of a short wave transmission apparatus according to the third embodiment of the present invention.
Figure 8:
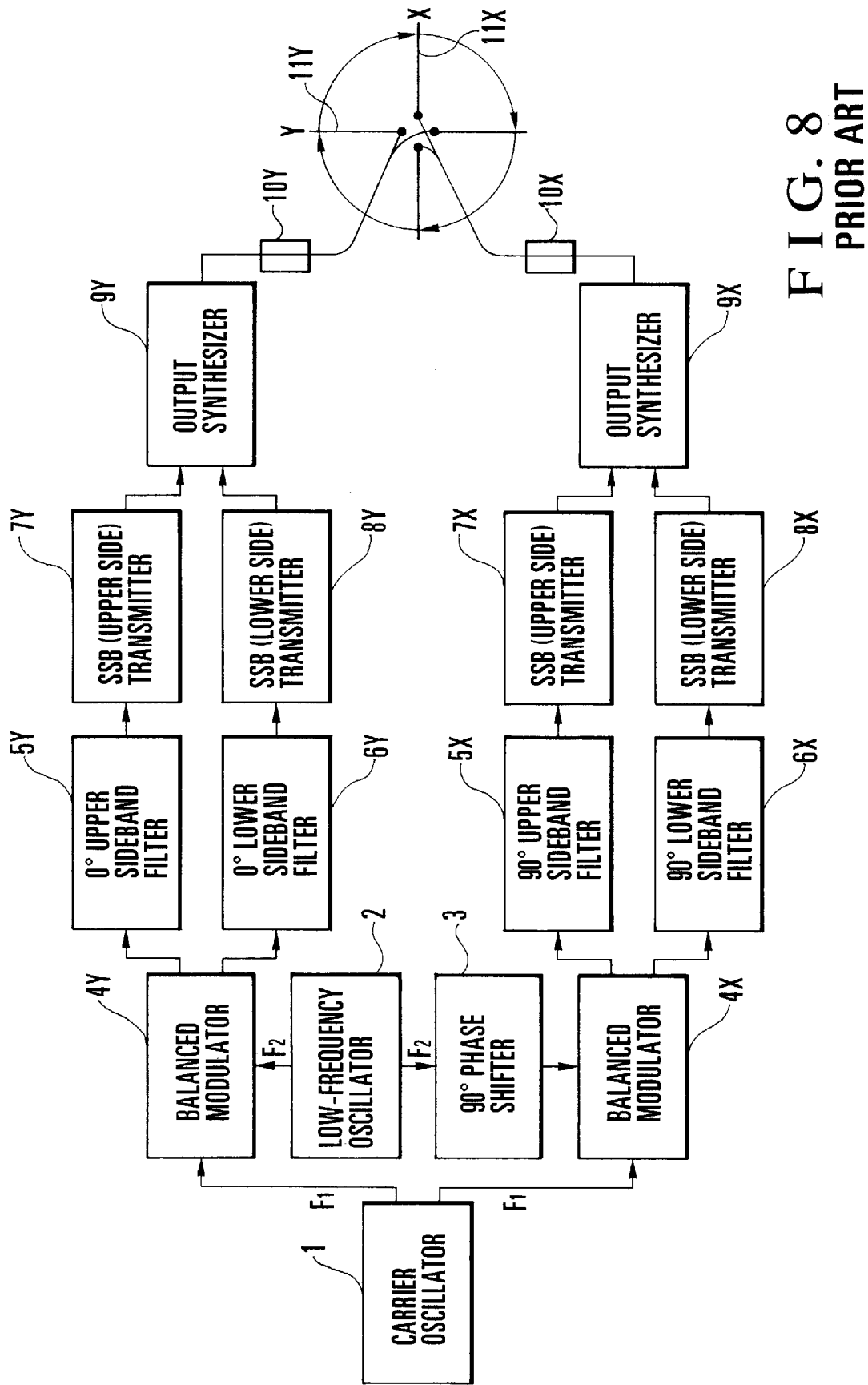
FIG. 8 is a block diagram showing the arrangement of the main part of a transmission apparatus for a radio communication system of a prior art.
Figure 9:
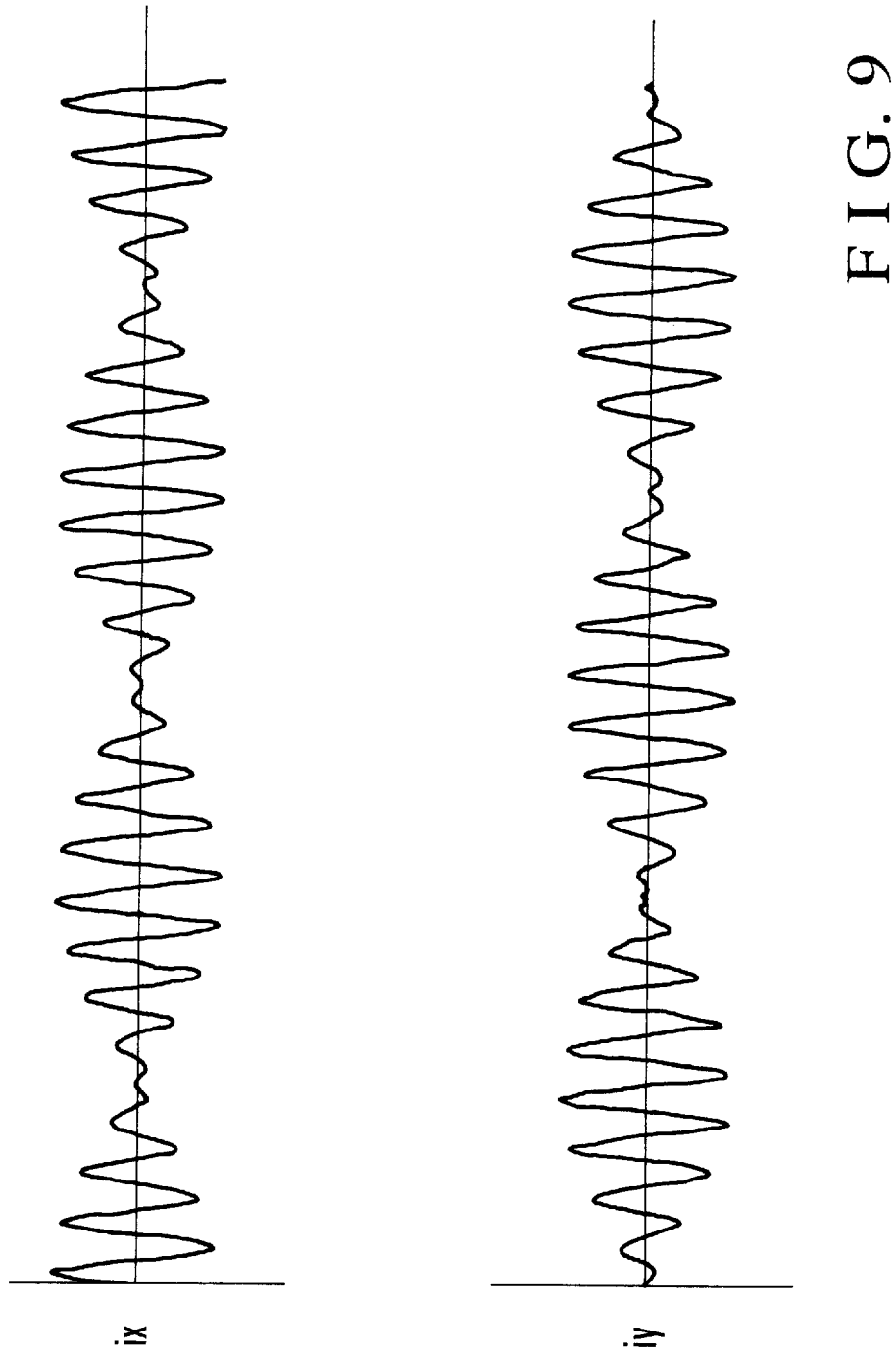
FIG. 9 is a timing chart showing the waveforms of signals output from dipole antennas in the radio communication system of the prior art.
Figure 10:
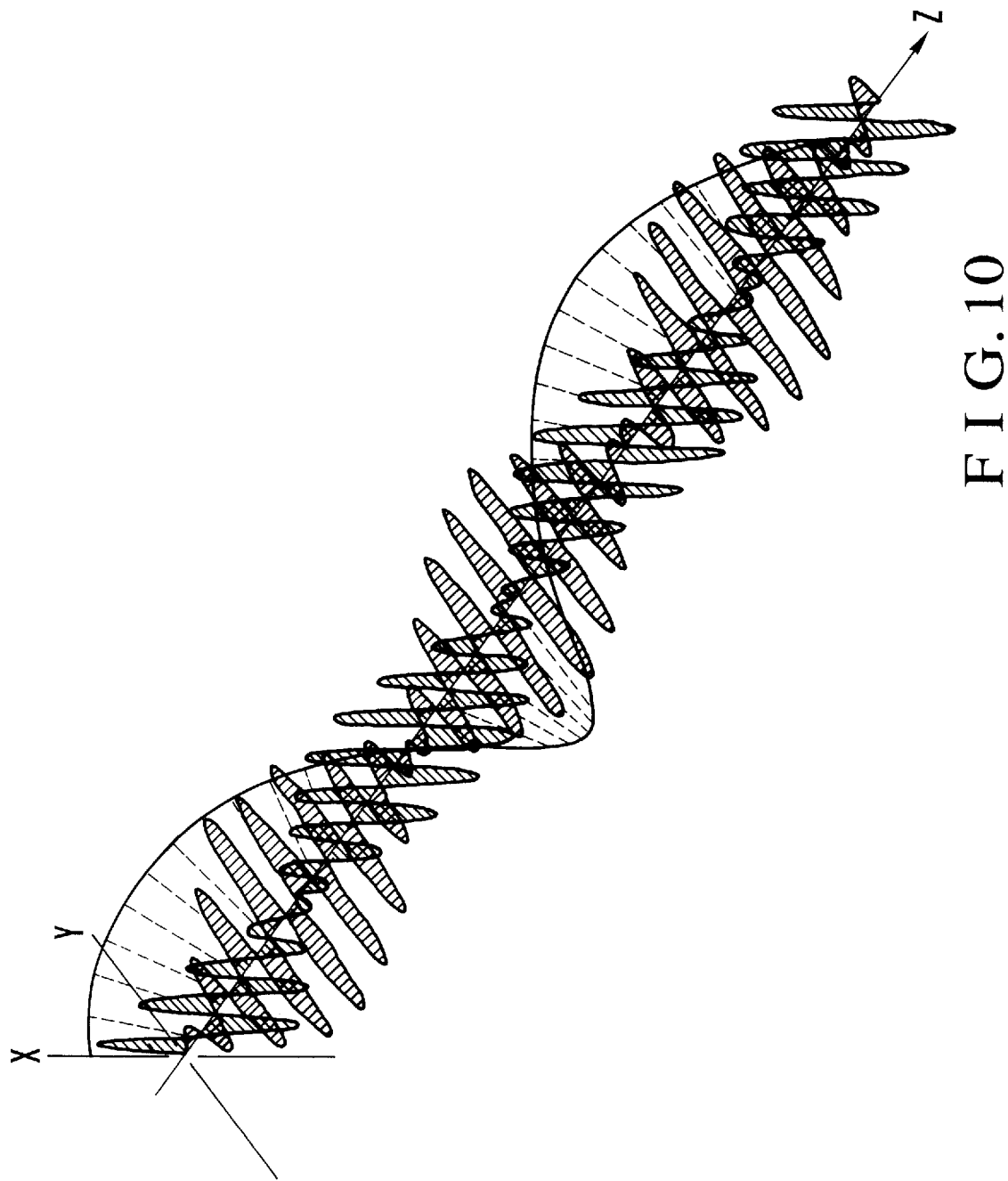
FIG. 10 is a view plotted using a computer, which shows a state wherein the plane of polarization is rotated when radio waves of the prior art shown in FIG. 9 are radiated from orthogonal dipole antennas.
Figure 11:
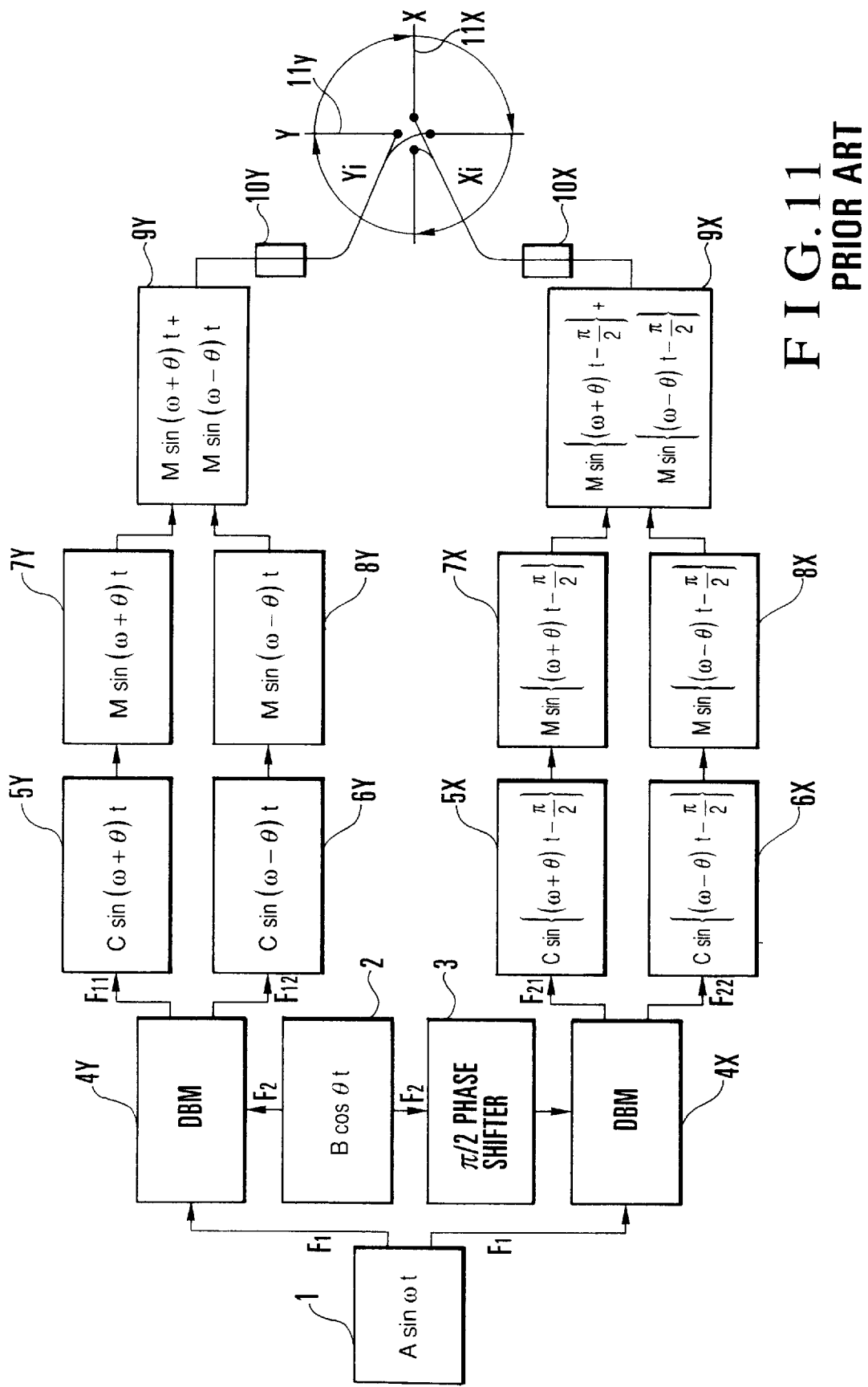
FIG. 11 is a block diagram for explaining a change in frequency (spectrum) and phase of each signal passing through the blocks in the transmission apparatus shown in FIG. 8 by using equations.
Figure 12:
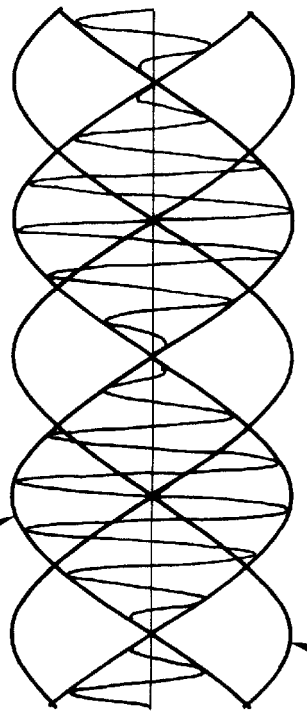
FIG. 12 is a chart showing the waveforms of short wave signals radiated from the prior art orthogonal dipole antennas 11X and 11Y shown in FIG. 8.
Figure 13:
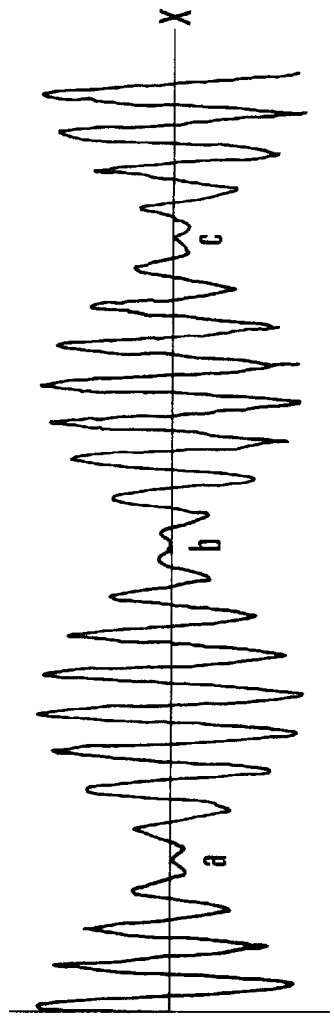
FIG. 13 is a chart showing the interference waveform of a current induced on a reception antenna by a prior art radio wave whose plane of polarization is rotated.

FIG. 7 shows the arrangement of the main part of a short wave apparatus according to the third embodiment of the present invention. The same reference numerals as in FIG. 6 denote the same parts in FIG. 7, and reference numeral 41 denotes an impedance matching device; 42, a reflecting plate; and 43, a helical antenna.

The short wave transmission apparatus shown in FIG. 7 has the same basic arrangement as in FIG. 6 and is different only in that the helical antenna 43 is used in place of the dipole antennas.

More specifically, a transmission carrier current $i_c$ amplified by an power amplifier 34 is supplied to the helical antenna 43 having the reflecting plate 42 through the impedance matching device 41.

A circularly polarized wave can be directly obtained because of the antenna characteristics of the helical antenna 43.

In this case, since the circumference of the helical antenna 43 must be equalized with a wavelength $\lambda$, the diameter of the helical antenna 43 becomes about $\lambda/3$.

The present invention is not limited to the above embodiments, and various changes and modifications can also be made without departing from the scope or spirit of the invention as defined in claim 1.

According to the short wave transmission apparatuses of claims 1 to 2, in radio communication in the short wave band which is not conventionally so useful, the reception disabled state caused by fading is prevented, so that high-quality transmission/reception is allowed.

This apparatus can be optimally used for radio communication in the short wave band which is important for maritime communication or international broadcasting and is also very useful for practical use of short wave radio transmission of digital data or facsimile data. Therefore, the application range can be largely increased.

In addition, the apparatus on the transmission or reception side can be constituted with a simple arrangement. Therefore, economical advantages and effective utilization of precious radio waves can also be achieved.

What is claimed is:

1. A short wave transmission apparatus having a transmission apparatus comprising:

carrier generation means for generating a carrier in a short wave band;

amplification means for amplifying the carrier;

means for dividing the amplified carrier;

a coaxial cable; and two orthogonal dipole antennas, wherein said dipole antennas are connected to a coaxial cable having a length for delaying a phase to be supplied to one antenna element by $\pi/2$ with respect to that to the other antenna element.

2. A short wave transmission apparatus having a transmission apparatus comprising:

carrier generation means for generating a carrier in a short wave band;

amplification means for amplifying the carrier;

impedance matching means for outputting the amplified carrier; and a helical antenna, wherein the carrier is input from said impedance matching means to said helical antenna, thereby radiating a circularly polarized wave.

* * * * *